United States Patent
Sebastian (10) Patent No.: US 6,641,726 B1
(45) Date of Patent: Nov. 4, 2003

(54) FILTER DEVICE, AND FILTRATION AND CLEANING METHOD

(75) Inventor: Horst J Sebastian, Westhofen (DE)

(73) Assignee: H. Strassburger GmbH & Co. KG, Westhofen (DE)

(*) Notice: Subject to any disclaimer, the term of this patent is extended or adjusted under 35 U.S.C. 154(b) by 0 days.

(21) Appl. No.: 09/831,475

(22) PCT Filed: Nov. 11, 1999

(86) PCT No.: PCT/EP99/08708

§ 371 (c)(1),
(2), (4) Date: May 9, 2001

(87) PCT Pub. No.: WO00/29089

PCT Pub. Date: May 25, 2000

(30) Foreign Application Priority Data

Nov. 12, 1998 (DE) .......................... 198 52 084

(51) Int. Cl.[7] .............................. B01D 25/12
(52) U.S. Cl. .................. 210/225; 100/197; 100/211; 210/227; 210/230; 210/231
(58) Field of Search ................ 210/224–225, 210/227–231, 232; 100/197, 211

(56) References Cited

U.S. PATENT DOCUMENTS

| | | | | |
|---|---|---|---|---|
| 3,931,014 A | * | 1/1976 | Heimbach et al. | 210/231 |
| 3,957,645 A | * | 5/1976 | Kurita et al. | 210/231 |
| 4,235,721 A | * | 11/1980 | Nakamura et al. | 210/227 |
| 4,608,164 A | * | 8/1986 | Neu | 210/231 |
| 4,749,482 A | * | 6/1988 | Bonn | 210/231 |
| 5,198,123 A | * | 3/1993 | Stover et al. | 100/197 |
| 5,246,578 A | * | 9/1993 | Spiegel et al. | 210/225 |
| 5,366,627 A | * | 11/1994 | Kearney et al. | 210/224 |
| 5,484,526 A | * | 1/1996 | Bonn | 210/231 |

FOREIGN PATENT DOCUMENTS

| | | |
|---|---|---|
| DE | 19 85 323 | 5/1968 |
| DE | 22 51 265 | 5/1974 |
| DE | 39 06 816 | 9/1990 |
| DE | 39 32 422 | 4/1991 |
| DE | 88 17 054.3 | 5/1992 |
| EP | 0 142 173 | 5/1985 |
| EP | 0 207 555 | 1/1987 |
| EP | 0 232 735 | 8/1987 |
| EP | 0 318 872 | 6/1989 |
| EP | 0 419 931 | 4/1991 |
| FR | 2 720 658 | 12/1995 |
| GB | 2 200 301 | 8/1988 |
| GB | 1 022 928 | 3/1996 |

OTHER PUBLICATIONS

Ulmmans Enclyklopadie der technischen Chemie, 4. Auflage, Band 2, 1972, pp. 178–181, 194.

Lueger, Lexikon der Technik, 4, Auflage, Band 16, 1970, pp. 148–149.

* cited by examiner

Primary Examiner—Joseph Drodge
(74) Attorney, Agent, or Firm—Hudak, Shunk & Farine, Co. LPA (57) ABSTRACT

The present invention relates to a filter device for completely removing residual amounts, after filtration, from the space of the unfiltered product. The filter device comprises a plurality of parallel filtration plates which are separated by filtration layers as well as by membrane plates submitted to the action of pressurized air. The membrane plates are exclusively covered on both sides by a stretched membrane, wherein said membranes have a smooth outer surface and are made of a flexible material so as to cover completely the adjacent space of the unfiltered product.

15 Claims, 7 Drawing Sheets

FILTER DEVICE, AND FILTRATION AND CLEANING METHOD

This application is a 371 of PCT/EP99/08708, filed Nov. 11, 1999 and claims the benefit of Germany application 198 52 084.0, filed Nov. 12, 1998.

FIELD OF THE INVENTION

The invention relates to a device for the continuous filtration of fluids by means of the pressure differential between the inlet and outlet, as well as the removal of residual amounts of the slurry by means of a pneumatic pressure medium before opening the device, said device having a plurality of filter plates having a slot on both sides for seating a planar filter medium and equipped with drainage channels for the filtrate;

a plurality of membrane plates having connections, bores and recesses for the admission of the pressure medium, which membrane plates are covered on both sides with an elastic membrane such that a slurry chamber or a filter cake chamber is formed between the filter medium and the membrane;

corresponding recesses in the filter plates and membrane plates which when installed form at least one admission channel for the slurry and one drainage channel for the filtrate, and also having end plates, retaining fixtures and clamping fixtures to connect the filter plates, membrane plates and frames to form a filter pack that can later be disassembled.

The invention also relates to a filtration and cleaning method. From the aspect of its structural design, such a device belongs to the group of devices known as filter presses. However, it is used for filtration like a plate filter, in which the filtrate is forced through the filter medium by means of the pressure differential of the fluid between the inlet and the outlet.

BACKGROUND OF THE INVENTION

A prior art example of a plate filter is disclosed in DE 39 06 816 C3. There are a plurality of filter plates arranged in parallel consolidated into a filter pack. When assembled, filter beds is pressed together between mating surfaces of the filter plates, which provide a seal between the slurry chambers and the filtrate chambers, and seal the entire filter pack to the outside.

A prior art example of a filter press is disclosed in DE 39 32 422 A1. The membrane plates alternately disposed between the usual filter plates comprise a circular frame with connections for the admission and drainage of a pressure medium, and a central wall, with a membrane attached to each side of a frame symmetrical to the central wall via a clamping ring. The axial length of the filter press is due to the cumulative width of the filter plates and the frame elements of the membrane plates. The space between the central wall of the membrane plate and the filter media attached to both sides of the filter plates is divided by the membranes into roughly equal sized suspension and pressure medium chambers. The frame elements have bead-like elevations extending along the axis of the filter device, over which elevations the membranes are stretched to improve their durability/stability when subjected to cyclic loads of up to 120 bar in these particularly critical areas. Because the membrane is stretched and arranged in this manner, the membrane is not extended but compressed when impinged by the pressure medium during the press process. As a result, the membrane never makes complete contact with the membrane plate when unpressurized, nor can the membrane make complete contact and lie flat against the filter plate when pressurized. Given the purpose of the generic device, the prior art filter press has an unnecessarily long axial length due to the pressure media chambers between the membranes and the central walls of the membrane plates. In other words, the space between the filter plate and the membrane plate that can be used as a slurry chamber is quasi halved because of the central position of the membranes, which under otherwise identical conditions also results in an oversized filter press.

The prior art also discloses filter devices in which pressurized membranes work in conjunction with filter cloths that must completely or partially match the change in shape of the membranes during filtration. In these cases, the membranes are equipped on the side facing the filter cloth with spacing cams so that the filtrate passing through the filter cloth can drain between the filter cloth and the membrane. Such membranes are unsuited for the intended application of the device according to the current invention.

SUMMARY OF THE INVENTION

The object of the current invention is therefore to refine a prior art device as described above for the filtration of fluids such that the residual losses can be significantly reduced compared to conventional plate filters without having to accept the disadvantages of prior art filter presses.

To achieve this object, the current invention teaches that the filter medium comprises sections of a sheet filter material mounted in the recesses of the filter plates; that the membranes, which when pressurized expand elastically to completely contact the filter plates or sheet filter material, have a smooth surface on both sides and make complete contact with the membrane plates when depressurized.

Sections of a proven and inexpensive sheet filter material can be used as the filter medium because the normal filtration process is the same as with conventional plate filters. Sheet filter material has a labyrinth-like depth filtration structure, which when used in conjunction with different surface charges permits both mechanical and adsorptive separation of particles along the relatively long path through the filtration medium. These materials, also known as filter beds, are special paperboards for the filtration of fluid media with the goal of removing coarse to super-fine particles, colloids, microorganisms and other undesirable components, and thus maintain the desired quality of the filtrate or to extract solid residues. These are manufactured using special paper machines, primarily Fourdrinier paper machines.

The raw materials are usually selected, bleached celluloses from conifer or deciduous woods of high purity, i.e. with high alpha content, selected diatomaceous earths and perlites, as well as manmade fibers such as polyolefin fibers, activated carbon, polyvinylpyrrolidone (PVP) or similar materials for special applications.

Most filter beds can be backed on the downstream side to prevent the loss of fibers during filtration without adversely affecting flowthrough. Certain approved resins can be used in small amounts to achieve specific effects (interfacial potentials, zeta potential).

The selection of raw materials, the processing thereof and the blending ratios together with other manufacturing parameters determine effectiveness and application.

The alternately disposed membrane plates are only activated when forcing residual amounts of the product from the slurry chamber prior to opening the device, and the remaining filtrate is forced by means of the pressurized membranes through the filter cake and the filter medium.

Because the slurry chamber is completely lined by the membrane when pressurized, it is possible to reduce the residual losses to nearly zero because the slurry chamber can be almost completely emptied by means of the membranes, and because the filter cakes are also mechanically pressed. The filter cake is solidified and nearly completely free of residual filtrate. The filter cake is almost completely dry and can be easily removed together with the filter medium after opening the filter device. The filter cake is thus prepared for further processing as is required in some filtration applications, such as the separation of blood plasma, for example.

A membrane that is smooth on both sides prevents filter cake constituents from sticking to the membrane, and also ensures that the drainage channels in the filter plates can be optimally covered when impinged with a fast-flowing detergent for cleaning.

The drainage channels on the filter plate are preferably vertical and horizontal grooves in the filter plate in the area of the groove for the sections of the sheet filter material.

The drainage channels on the filter plate are preferably vertical and horizontal grooves formed in the area of the slot in the filter plates for the sections of sheet filter material.

The horizontal and/or vertical grooves are preferably connected to at least one filtrate manifold in the interior of the filter plate.

At least one frame is located between each membrane plate and the filter bed to define and adjust as necessary the size of the slurry chamber. This makes it possible to adapt the size of the slurry chamber to the filtration job, in particular when the thickness of the filter cake is not the same for all filtration processes.

The frames can be polygonal, preferably square, and enclose both horizontally and vertically a slurry or filter cake chamber having a trapezoidal cross-section, whereby the boundary surface formed by the membrane plate is larger than the boundary surface formed by the opposing filter plate.

It is advantageous for the frame to have beveled inner surfaces to facilitate the expansion and contacting of the membranes when inflated. The bevel is preferably such that the frame thickness continuously decreases from the membrane side to the filter bed side. This prevents dead spaces because the inflated membrane can completely line the slurry chamber.

The membrane plate is preferably equipped with a support body on which the membrane is arranged. A compressed air duct is preferably located in the support body, which duct is connected via outlet openings to the two surfaces of the support body adjacent to the membranes. The compressed air duct is preferably branched. The recesses for the inlet and drainage channels in the filter plates are preferably in the area of the slots for the sections of sheet filter material.

The sections of sheet filter material can preferably be pressed together edge-to-edge between the filter plates and the frames to form a seal. The sections of sheet filter material are used to form a seal between the chambers containing the slurry and the filtrate, as well as to seal the device to the outside. The advantage of this is that additional seal elements are not required.

The measure also helps ensure that the membranes extend over the entire surface of the membrane plates and when installed are clamped together edge-to-edge between the membrane plates and the frames to form a seal.

The membranes preferably protrude over the uniform contour of the filter plates at least in the area of the connections for the pneumatic pressure medium. This configuration offers the advantage that the fasteners for the membranes are accessible from outside the device.

The compressed air connections of the membrane plates are located on the end face of the membrane plates, preferably outside of the vertical, longitudinal midplane of the device. This significantly aids side access to the compressed air connections by operating personnel during installation.

The filter plates can have a groove running around the outside on both sides at some distance from the edge for seating a seal, which seal can be considered a supplemental measure given the seal function already provided.

The filter plates, membrane plates and/or the frames are made primarily of plastic, preferably polypropylene or polypropylene copolymers so that FDA listing can be attained and the device can be used for the filtration of sensitive fluids. The filter device is therefore particularly suited for blood filtration.

The membrane is preferably made of a thermoplastic elastomer. The advantage of this material that it is very highly flexible, enabling the membrane to completely contact the contour of the slurry chamber.

The method for filtering fluids using the device teaches that actual filtration is by means of the pressure differential of the fluid between the inlet and the outlet, and that the membrane plate is impinged by a pressure medium, pressing the membranes against the filter cakes, filter media and filter plates to press out residual amounts of slurry and to dry and solidify the filter cake.

The method for cleaning the device teaches that the filter plates, membrane plates and possibly the frames without sections of sheet filter material are first assembled, the membranes are inflated until contacting or nearly contacting the filter plates, and finally a fast-flowing cleaning fluid is sent through the filtrate drainage channels in the filter plates.

It is possible to only inflate the membrane far enough to create a small space between the membrane and the filter plate with a correspondingly small cross-section so that high velocity cleaning fluid flows can be achieved. The flow velocity of 2 m/s required for optimal cleaning can be easily achieved.

DETAILED DESCRIPTION OF THE INVENTION

Figure 1:
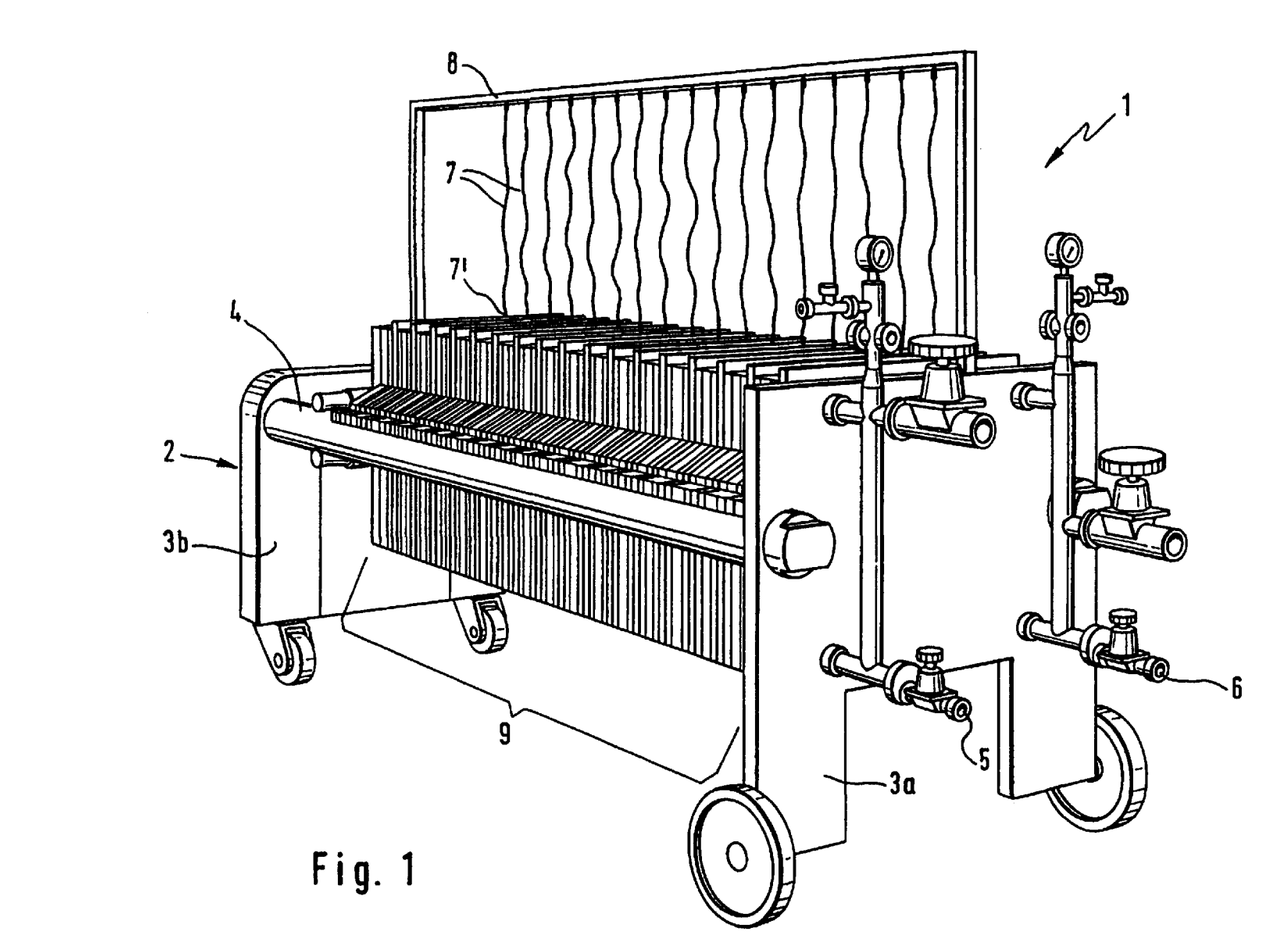
FIG. 1 a perspective view of the filter device.

FIG. 1 is a perspective view of a filter device 1. The filter device has a moveable frame 2 with a frame plate 3a, b on each end, which frame plates are connected together by means of two side rails 4. The filter plates 40, frames 20 and membrane plates 30 are hung from these side rails 4 to form a plate arrangement 9 and pressed together by means of a pressing device to form a seal. The membrane plates 30 have compressed air connections 7' to which hoses 7 are connected, which hoses are run over a bar 8 to a common compressed air supply (not shown).

Connections 5 and 6 for the filtrate inlet and filtrate outlet are provided at the front of the frame 2 and are connected to the filtrate and slurry channels within the plates 30, 40 and the frames 20. Appropriately dimensioned eyes are provided in the corners of the plates 30, 40 and the frames 20 to form these filtrate and slurry channels.

Figure 2A:
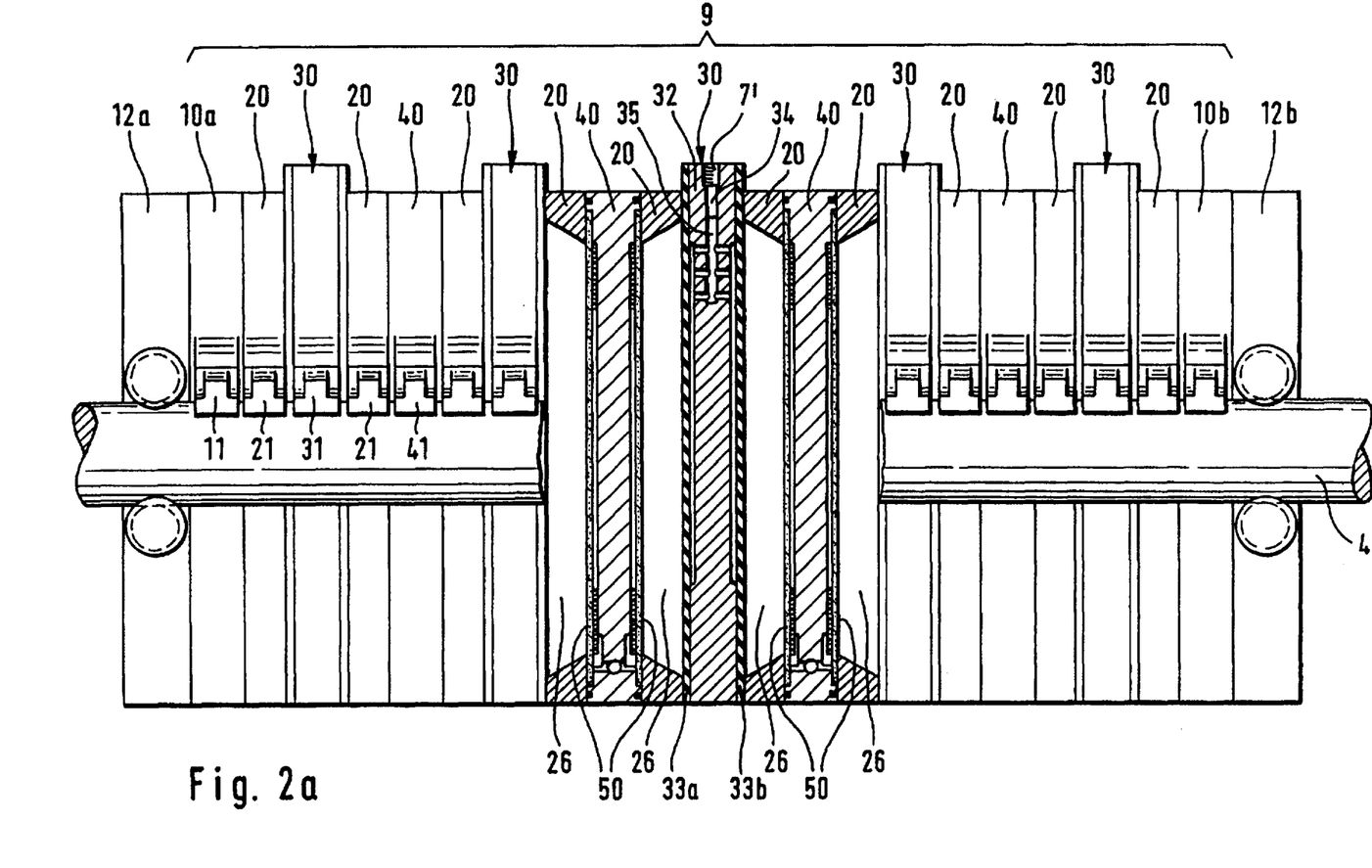
FIGS. 2a, b a side view, partly in section, of the filter arrangement, with inflated and uninflated membranes.

A filter plate arrangement 9 is shown in detail in FIG. 2a. Loose covers 12a, 12b are located at both ends of the complete arrangement, which covers exert pressure against the plates and frames arranged between the covers via a suitable thruster. Immediately adjacent to the two loose covers are the end plates 10a and 10b. Then comes a frame 20, a membrane plate 30, another frame 20 and a filter plate 40. This arrangement is then repeated any number of times. All frames and plates have support lugs 11, 21, 31, 41 by means of which they are supported for movement on the side rail 4.

The middle section is a sectional view of the individual plates, which are described in detail with reference to the remaining figures. The frame 20 essentially comprises a rectangular or square frame, which is in tight contact with the adjacent membrane plate 30 or membrane 33a, b and the filter plate 40 or filter bed 50. The frame 20, together with the adjacent filter bed 50 and the membrane 33a, b, delimits the slurry chamber 26. The filter plate 40 comprises a solid plastic component having horizontal and vertical grooves on the side surfaces. The filter beds 50 are inserted into corresponding slots.

Figure 2B:
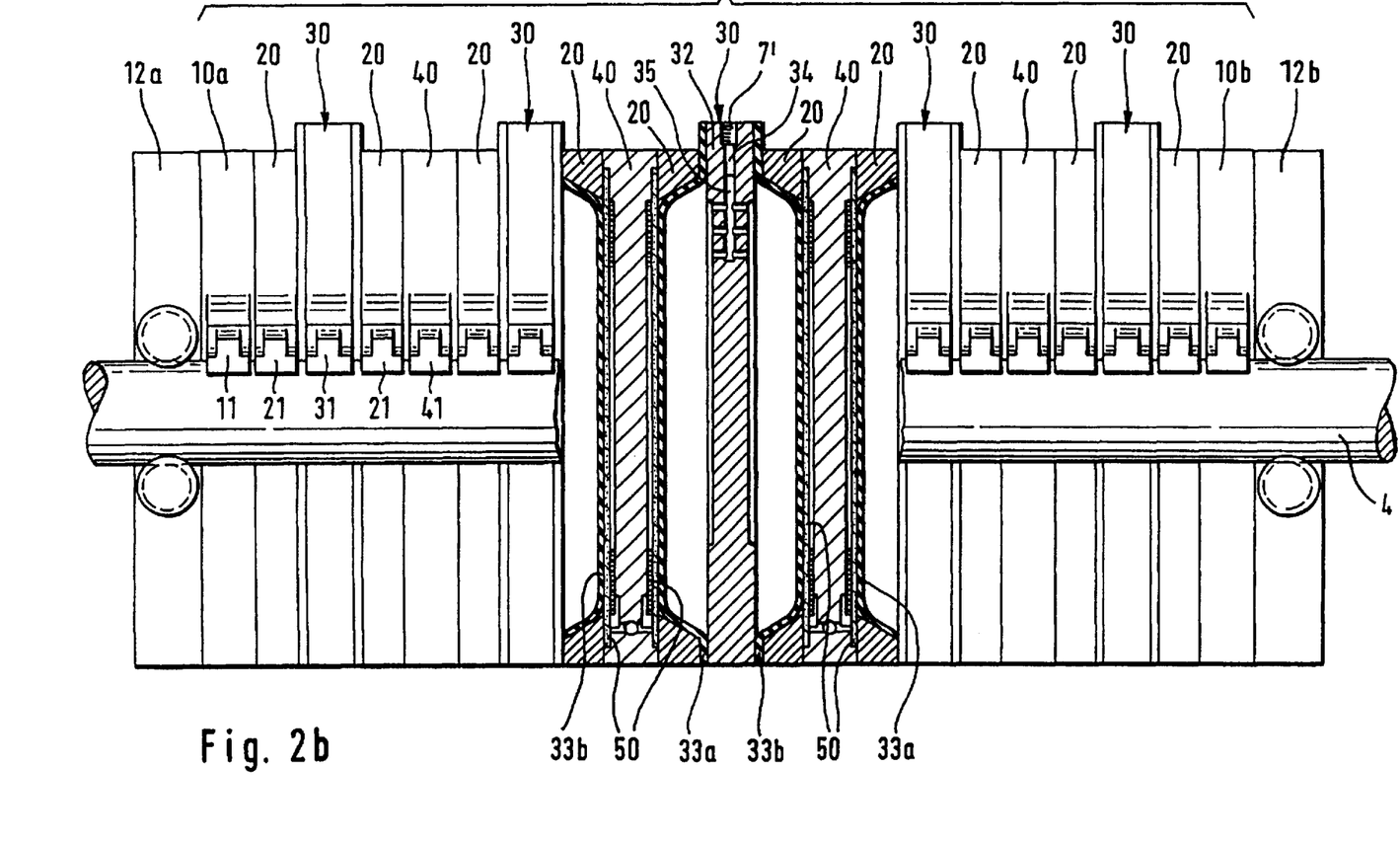

The membrane plate 30 always protrudes above the other components and has a support body 32, on both sides of which there is a membrane 33a, b. The membranes 33a, b can be inflated via a compressed air duct 34 so that they extend into and completely line the slurry chamber 26, as is shown in FIG. 2b. The filter cake that forms during filtration is not shown so that the membrane 33a, b is in direct contact with the filter bed 50.

Figure 3A:
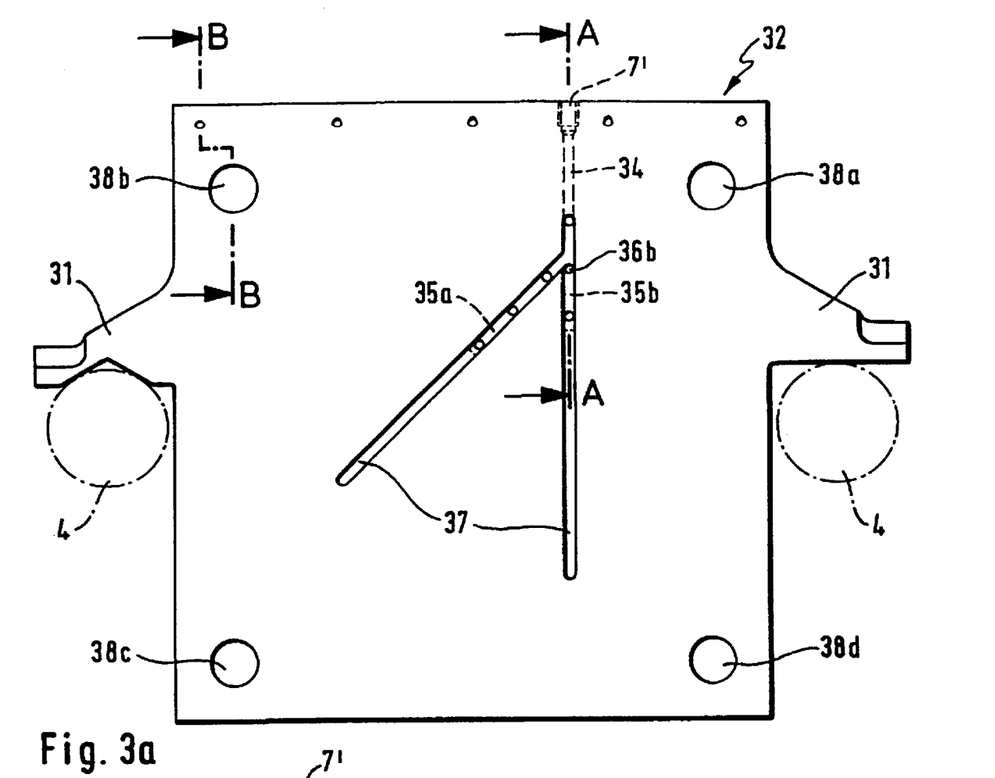
FIGS. 3a–c top views and partial sections of the membrane plate.

Such a membrane plate 30 is shown in detail in FIG. 3a. The support body 32 of the membrane plate 30 has a rectangular or square contour and lugs 31 on the sides by means of which the membrane plate is supported on the side rail 4. The compressed air connection 7' located off-center on the top of the plate is in communication with a compressed air duct 34 in the interior, which duct has two branches 35a and b. In the embodiment shown here, the branches form a Y.

Figure 3B:
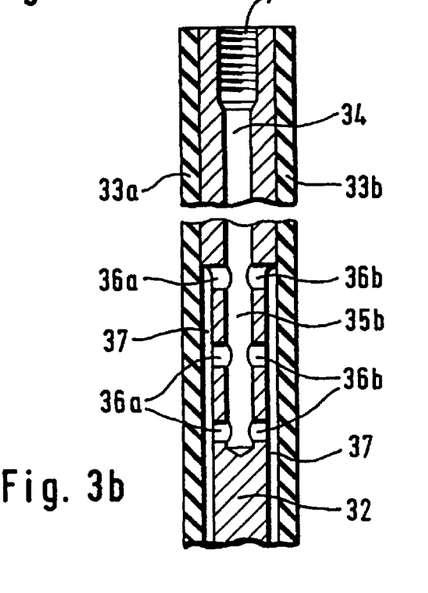

As can be seen in FIG. 3b, each compressed air duct 34 or corresponding branches 35a and b extend through the center of the support body 32 of the membrane plate 30 and is equipped with outlet openings 36a, b that end at both surfaces of the support body 32, thus forming a connection to the two grooves 37 in the surface of the support body 32. The grooves 37 improve the distribution of air below the membrane 33a, b so that the membranes 33a and b can be easily inflated.

Figure 3C:
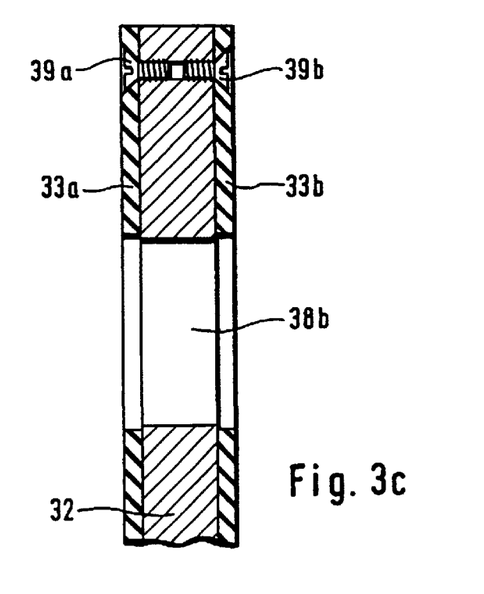

FIG. 3c shows how the membranes 33a, b are bolted by means of the two bolts 39a, b. The eyes 38a–d, together with the eyes in the other components, form channels for the filtrate and the slurry.

Figures 4A, 4B, 4C:
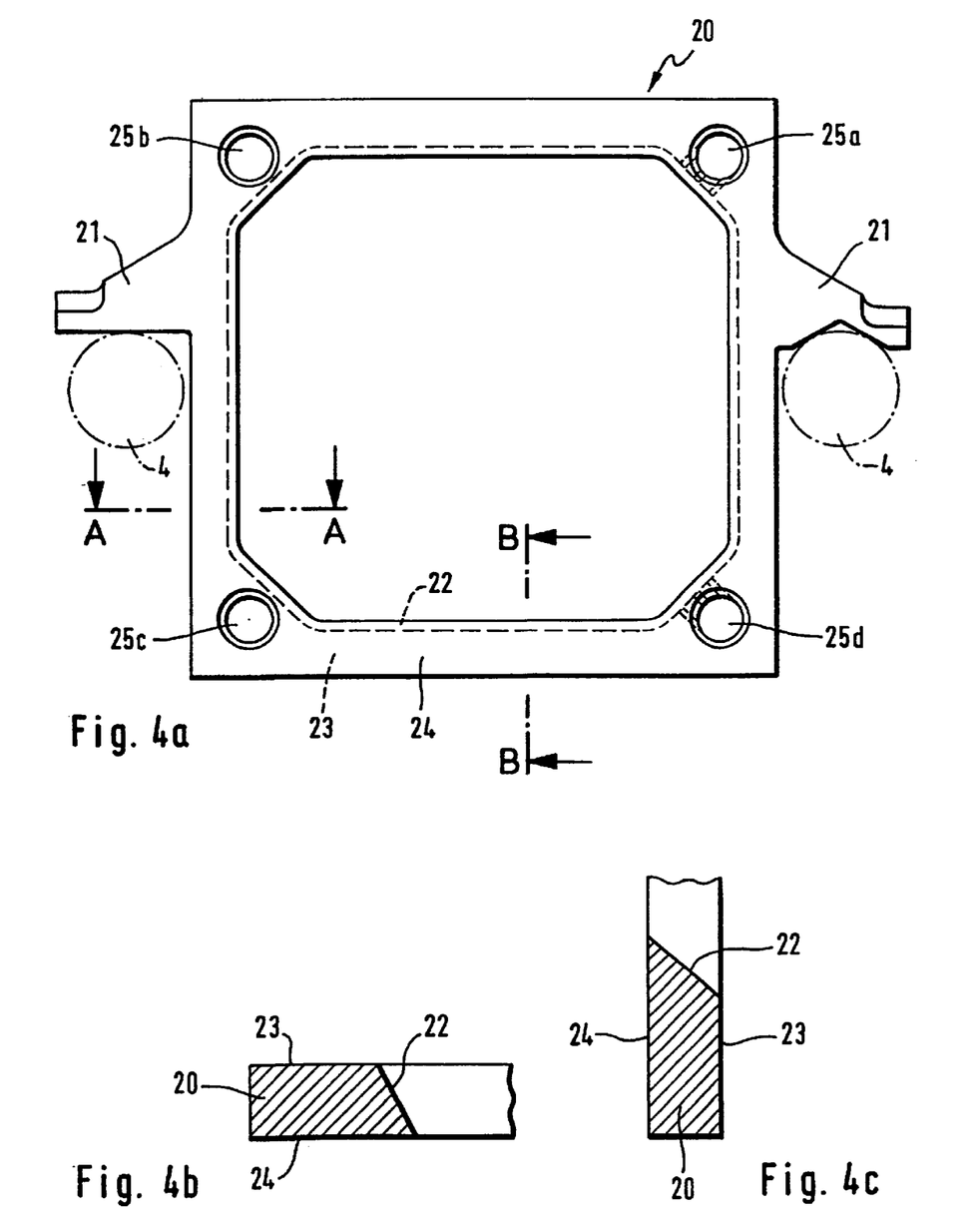
FIGS. 4a–c top views and partial sections of the frame.

FIG. 4a shows a frame 20 also having four eyes 25a–d at the same locations. Frame 20 also has support lugs 21 that rest on the side rails 4. As is shown in Sections A—A and B—B in FIGS. 4b and 4c, respectively, the inner surfaces 22 are beveled. The bevel is from the filter bed side 24 toward the membrane plate 30 (membrane side 23) so that the membrane 33a, b can more easily lie against the contour of the frame 20 and thus the contour of the slurry chamber 26 when inflated.

Figures 5A, 5B, 5C:
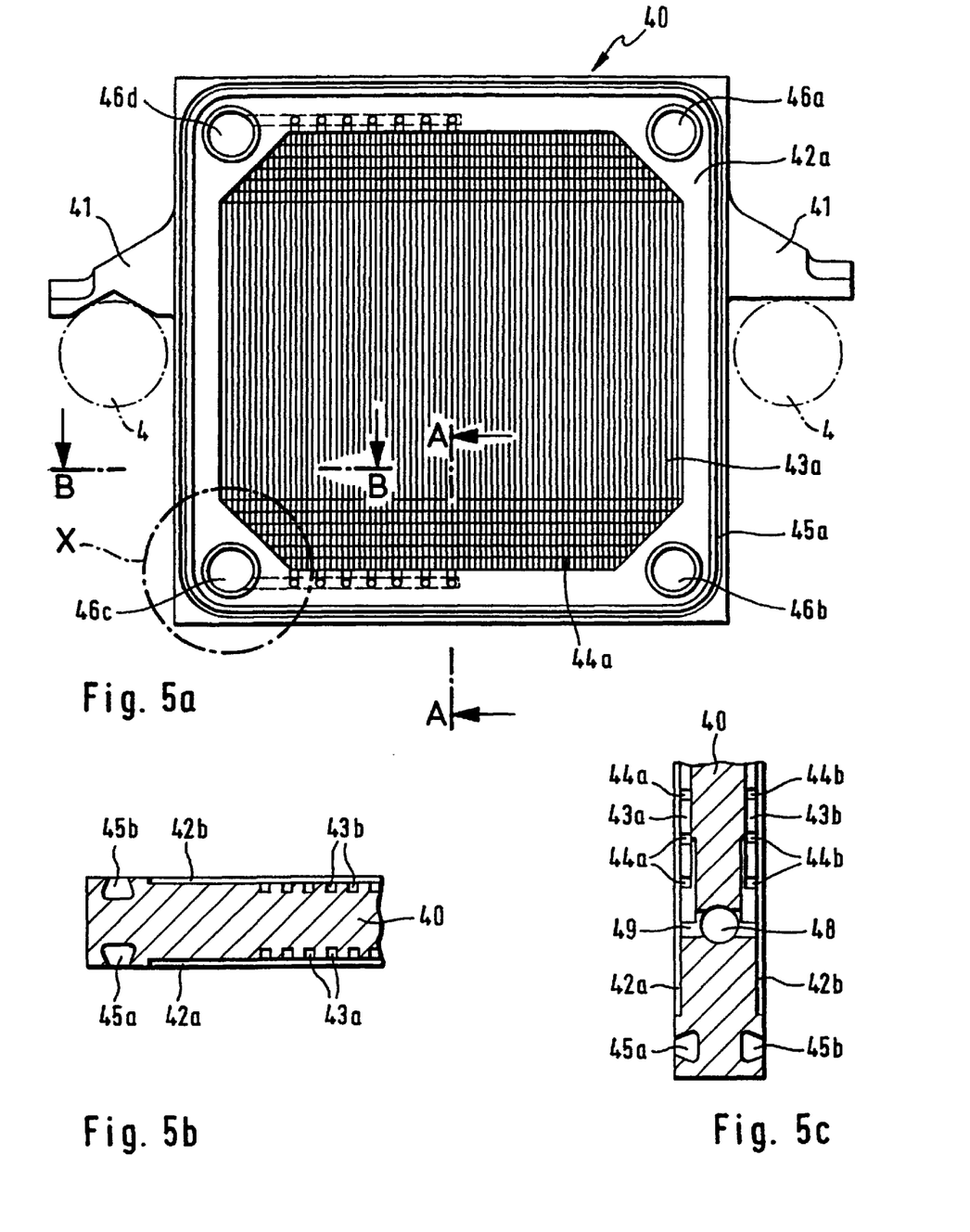
FIGS. 5a–d top views and partial sections of a filter plate.

FIG. 5a shows a top view of a filter plate 40 without the filter bed 50. This plate also has corresponding eyes 46a–d and support lugs 41. A slot 45a, b runs around each edge for seating a round cord as a seal.

In that area where the filter bed 50 is applied the filter plate 40 has a corresponding slot 42a/42b on each side, which slot also encompasses the area with the eyes 44a–d because the filter bed also has eyes at the corresponding locations. The depth of the slot 42a, b is roughly equal to the thickness of the filter bed 50 to be inserted. Located in this area are both horizontal grooves 44a, b and vertical grooves 43a, b, which enable the filtrate beneath the filter bed 50 to drain (cf. FIGS. 5a–d). The horizontal grooves 44a, b are each arranged in an upper and lower strip-like area and provide lateral distribution of the filtrate. The filtrate is collected in a laterally running filtrate channel 48, which is connected via connecting openings 49 to the grooves in the lower section of the filter plate 40. This manifold 48 is connected to the eye 46c. The upper eye 46d is connected to a corresponding duct arrangement for the supply of air.

Figure 5D:
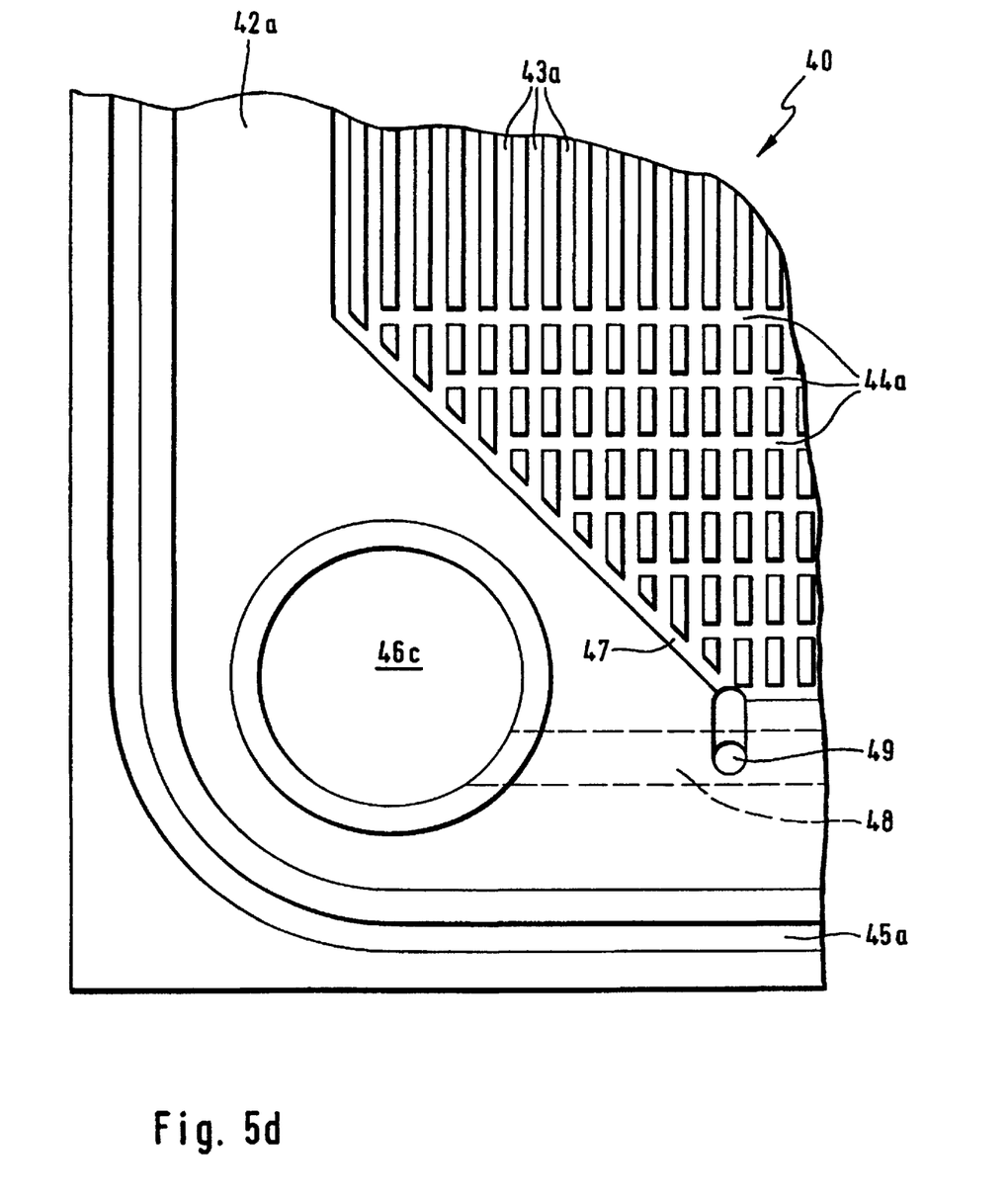

An enlarged view of the vertical and horizontal grooves is shown in FIG. 5d, in which the detail X is enlarged. The outer vertical groove 43a becomes a diagonal groove 47 in the area of the eye 46c.

REFERENCE NUMBERS

1 Filter device
2 Frame
3a, b Frame plate
4 Side rail
5 Filtrate inlet
6 Filtrate outlet
7 Compressed air hose
7' Compressed air connection
8 Bar
9 Plate arrangement
10a, b End plate
11 Support lug
12a, b Cover
20 Frame
21 Support lug
22 Inner surface
23 Membrane side
24 Filter bed side
25a–d Eye
26 Slurry chamber
30 Membrane plate
31 Support lug
32 Support body
33a, b Membrane
34 Compressed air duct
35a, b Duct branch
36a, b Outlet opening
37 Groove
38a,b,c,d Eye
39a, b Bolt
40 Filter plate
41 Support lug
42a,b Slot
43a,b Vertical groove
44a,b Horizontal groove 45a,b Slot for round cord
46a–d Eye
47 Diagonal groove
48 Manifold
49 Connecting opening
50 Filter bed, section of sheet filter material

What is claimed is:

1. A device for the continuous filtration of fluids by means of a pressure differential between the inlet and outlet, as well as the removal of residual amounts of the slurry by means of a pneumatic pressure medium before opening the device, said device comprising:

a plurality of filter plates having a slot on both sides for seating a planar filter medium and equipped with drainage channels for the filtrate;

a plurality of membrane plates having connections, bores and recesses for the admission of the pressure medium, which membrane plates are covered on both sides with an elastic membrane such that a slurry chamber or a filter cake chamber is formed between the filter medium and the membrane, whereby the membranes, which when pressurized expand elastically to completely contact the filter plates or sheet filter material, have a smooth surface on both sides and make complete contact with the membrane plate when depressurized;

frames between the membrane plates and the filter plates which delimit the slurry chamber, corresponding recesses in the filter plates and membrane plates which when installed form at least one admission channel for the slurry and one drainage channel for the filtrate, and end plates, retaining fixtures and clamping fixtures to connect the filter plates and membrane plates to form a filter pack that can later be disassembled, wherein the filter medium comprises sections of a sheet filter material mounted in the slots, and that sections of sheet filter material can be pressed together edge-to-edge between the filter plates and the frames to form a seal.

2. A device as claimed in claim 1, wherein the drainage channels comprise vertical grooves and horizontal grooves, and are formed in the filter plates in the area of the slots for the sheet filter material.

3. A device as claimed in claim 2, wherein the grooves are connected to at least one filtrate manifold inside the filter plate.

4. A device as claimed in claim 1, wherein the frames are rectangular, and enclose both horizontally and vertically a slurry or filter cake chamber having a trapezoidal cross-section, whereby the boundary surface formed by the membrane plate is larger than the opposing boundary surface formed by the filter plate.

5. A device as claimed in claim 1, wherein the membrane plate has a support body on which the membranes are arranged and wherein there is a compressed air duct in the support body, said duct connected via outlet openings to the two surfaces of the support body adjacent to the membranes.

6. A device as claimed in claim 1, wherein the recesses for the inlet and drainage channels in the filter plates are in the area of the slots for the sections of sheet filter material.

7. A device as claimed in claim 1, wherein the sections of sheet filter material are used to provide a seal between the slurry chambers and the filtrate chambers, and to seal the device to the outside.

8. A device as claimed in claim 1, wherein the membranes extend over the entire surface of the membrane plates and when installed are clamped together edge-to-edge between the membrane plates and the frames to form a seal.

9. A device as claimed in claim 1, wherein the membrane plates protrude over the uniform contour of the filter plates at least in the area of the connections for the pneumatic pressure medium.

10. A device as claimed in claim 9, wherein the connections an the end of the membrane plates are preferably located outside of the vertical, longitudinal midplane of the device.

11. A device as claimed in claim 1 wherein the filter plates have a groove running around the outside on both sides at some distance from the edge for seating a seal.

12. A device as claimed in claim 1, wherein the membranes are of a thermoplastic elastomer.

13. A device as claimed in claim 1, wherein the filter plates, the membrane plates and/or the frames are of plastic.

14. A device as claimed in claim 1, wherein the frames are square, and enclose both horizontally and vertically a slurry or filter cake chamber having a trapezoidal cross-section, whereby the boundary surface formed by the membrane plate is larger than the opposing boundary surface formed by the filter plate.

15. The device of claim 1, wherein the fluids comprise blood.

* * * * *